(12) United States Patent
Graf et al.

(10) Patent No.: US 6,524,223 B2
(45) Date of Patent: Feb. 25, 2003

(54) DRIVE TRAIN FOR A MOTOR VEHICLE

(75) Inventors: Friedrich Graf, Sinzing (DE); Gregor Probst, Landshut (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/863,906

(22) Filed: May 24, 2001

(65) Prior Publication Data

US 2002/0039950 A1 Apr. 4, 2002

(30) Foreign Application Priority Data

May 24, 2000 (DE) .......................... 100 25 586

(51) Int. Cl.[7] .............................. B60K 41/04
(52) U.S. Cl. ......................................... 477/109
(58) Field of Search ........................... 477/109

(56) References Cited

U.S. PATENT DOCUMENTS

| | | | | |
|---|---|---|---|---|
| 5,046,383 A | * | 9/1991 | Butts et al. | ............... 477/109 |
| 5,282,401 A | * | 2/1994 | Hebbale et al. | |
| 5,307,270 A | * | 4/1994 | Graf | |
| 5,547,434 A | * | 8/1996 | Graf et al. | ............... 477/109 |
| 5,609,545 A | * | 3/1997 | Sola et al. | ............... 477/78 |
| 5,822,708 A | * | 10/1998 | Wagner et al. | ............... 701/54 |
| 5,855,533 A | * | 1/1999 | Tolkacz et al. | ............... 477/110 |
| 6,169,950 B1 | * | 1/2001 | Parigger | ............... 701/53 |
| 6,389,346 B1 | * | 5/2002 | Gianoglio et al. | ............... 701/51 |

FOREIGN PATENT DOCUMENTS

| | | |
|---|---|---|
| DE | 19725816 A1 | 1/1998 |
| DE | 19817497 A1 | 10/1999 |
| DE | 19906871 A1 | 8/2000 |

OTHER PUBLICATIONS

Kücükay and Lorenz, "Das Neue Fünfgang–Automatikgetriebe für die 3er– und 5er–Baureihe von BMW", ATZ Automobiltechnische Zeitschrift, 93:504–519 (1991).

* cited by examiner

Primary Examiner—Dirk Wright
(74) Attorney, Agent, or Firm—Morrison & Foerster, LLP

(57) ABSTRACT

In a drive train having an engine which is controlled by an engine controller and a transmission which is controlled by a transmission controller, an intervention signal is transferred to the engine controller from the transmission controller via a data link. The intervention signal has values by means of which operating states of the drive train are specified during the driving mode of the motor vehicle and during the gear shift operations of the transmission.

10 Claims, 5 Drawing Sheets

DRIVE TRAIN FOR A MOTOR VEHICLE

This application claims priority to German Application No. 10025586.8 filed May 24, 2000.

TECHNICAL FIELD OF THE INVENTION

The invention relates to a drive train for a motor vehicle, and in particular, to a drive train for a motor vehicle with which the wheel torque is constant and notches in the torque are avoided.

BACKGROUND OF THE INVENTION

In automatic transmissions, it is preferable to carry out gear shift operations as quickly and comfortably as possible. In this respect, the acceleration values, the wheel torque values on which the latter are based and the "jerk" or jerking of the drive train (which is derived therefrom) are decisive for the driver's perception.

In a conventional automatic transmission, constant comfortable gear shift operations are achieved, inter alia, by reducing the engine torque during the gear shift operation with an "engine intervention" by adjusting the ignition angle in a way which is adapted to the load (German periodical ATZ 93 (1991) Issue 9, pages 504–519). Details on a signal which can trigger the engine intervention are not given in the periodical, neither are measures for increasing comfort when performing gear shift operations by making the wheel torque constant.

A typical starter system for an internal combustion engine contains an electric machine whose rotor is connected fixed in terms of rotation, either directly or via a speed transforming transmission, to the crankshaft of the internal combustion engine in order to accelerate the internal combustion engine at least to a starting engine speed which is necessary for starting up (DE 198 17 497 A1).

The subject matter of application (DE 199 06 871 A1) describes a method for actuating an engine in a drive system which contains an automated transmission and an automated clutch, which optionally couples the engine to the transmission in order to transmit torque. If a gear shift operation is to take place, a prediction profile for an operating variable which characterizes the operating state of the engine is predefined for a time period of the gear shift operation. The engine is controlled in accordance with the predefined prediction profile in such a way that the deviation between the operating variable and the prediction profile is minimized.

SUMMARY OF THE INVENTION

In one embodiment of the invention, there is a drive train for a motor vehicle. The drive train includes, for example, an engine which is controlled by an engine controller, a transmission which is controlled by a transmission controller, and a data link between the engine controller and the transmission controller. The signals are exchanged during a gear shift operation of the transmission, sensor signals being transferred from the engine controller to the transmission controller and an intervention signal being transferred from the transmission controller to the engine controller, by means of which intervention signal the engine is controlled by the engine controller during the driving mode of the motor vehicle, the intervention signal has a plurality of values by which the engine torque is reduced with the engine controller during the gear shift operations of the transmission, the engine speed is adjusted to a predefined value, the engine torque is switched over to a new setpoint value and a jerk control is carried out by adjusting the engine speed.

In one aspect of the invention, the intervention signal has an initial value in which a normal driving mode applies without a gear shift operation, a first value in which a torque control is carried out, a second value in which a slow engine speed adjustment is carried out, a third value in which a torque control is carried out and a fourth value in which a rapid engine speed adjustment is carried out with the drive train closed.

In another aspect of the invention, a mixed engine torque and engine speed control is brought about by the second value of the intervention signal.

In yet another aspect of the invention, a torque adjustment is carried out by the first and third values of the intervention signal.

In still another aspect of the invention, the intervention signal has an initial value in which normal driving mode applies without a gear shift operation, a fifth value in which shift up operation is carried out, a sixth value in which the motor vehicle is accelerated, and a seventh value in which a shift down operation is carried out.

In one aspect of the invention, a combined engine torque and engine speed control is carried out at the fifth value of the intervention signal.

In another aspect of the invention, the engine speed is accelerated at the sixth value of the intervention signal.

In yet another aspect of the invention, an engine speed adjustment is carried out at the seventh value of the intervention signal.

In still another aspect of the invention, the drive train includes an engine which is embodied as a crankshaft starter generator.

In still another aspect of the invention, a rapid engine speed adjustment is performed to a predefined absolute value using the crankshaft starter generator.

BRIEF DESCRIPTION OF THE DRAWINGS

Exemplary embodiments of the invention are explained below with reference to the drawings.

DETAILED DESCRIPTION OF THE INVENTION

The invention provides a drive train with which the wheel torque is made constant and notches in this torque are avoided. Hence, comfort during gear shift operations is increased. The interplay of torque generators (internal combustion engines or electric motors) on the one hand and the torque transmission by means of clutches, gear wheel transmissions and planetary wheel sets on the other is important for success.

The intervention signal transferred from the transmission controller to the engine controller has a plurality of values by means of which the engine torque is reduced during the gear shift operations of the transmission using the engine controller. The engine speed is adjusted to a predefined value, the engine torque is switched over to a new setpoint value and a jerk control is carried out by adjusting the engine speed. In particular, this may be a first value at which normal driving mode applies without a gear shift operation, a second value at which a shift up operation is carried out, a third value at which the motor vehicle is accelerated, and a fourth value at which a shift down operation is carried out.

In the invention, devices which are commonly present in an engine controller, namely what is referred to as an anti-jerk function or jerk control, can be used. It is provided for a manual transmission and is triggered by means of a switch on the clutch pedal. As soon as a clutch engagement operation is detected, this function will attempt to compensate rapid changes in the engine speed with an engine speed adjustment. The engine torque is used as the manipulated variable.

Figure 1:
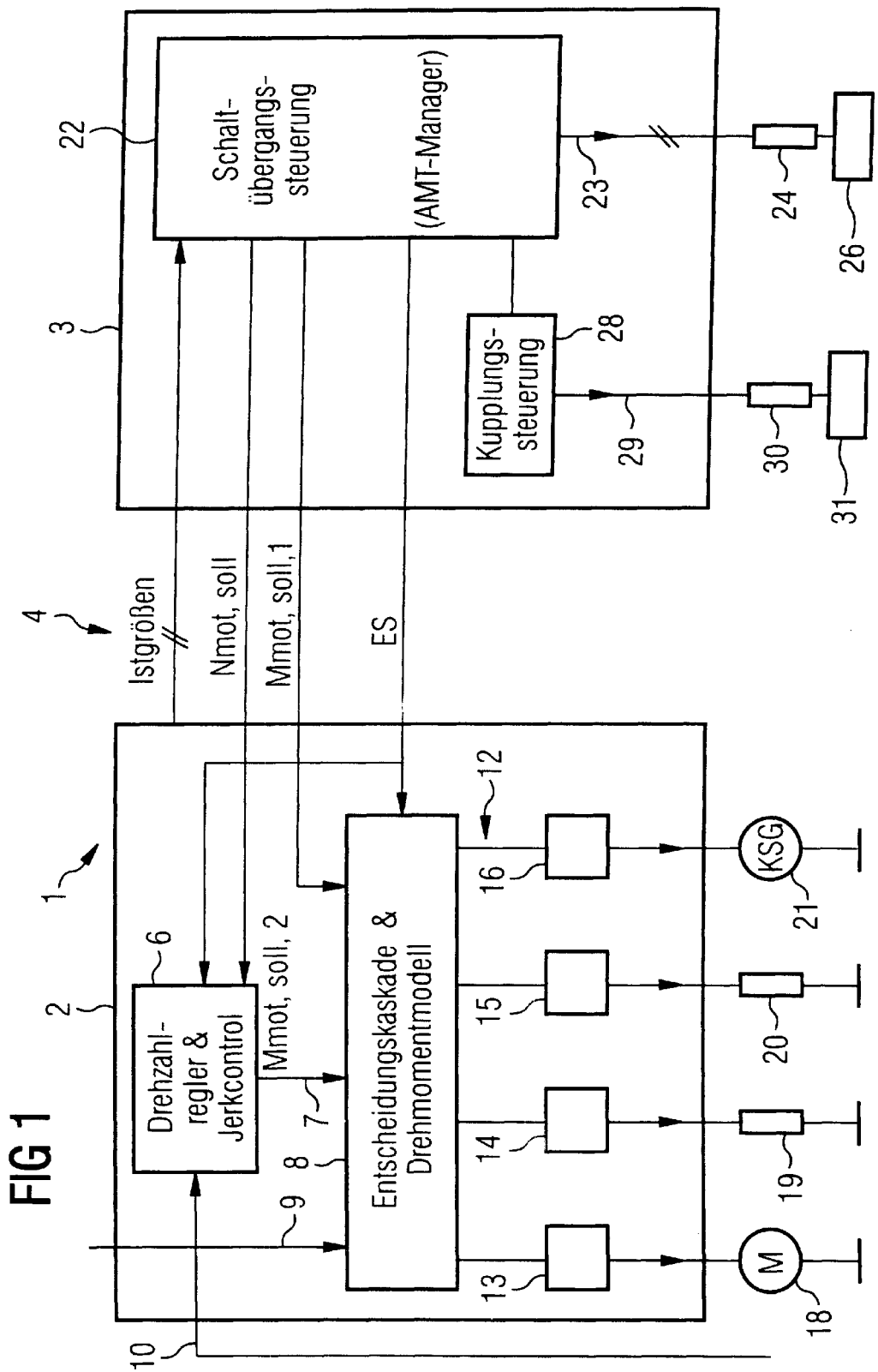
FIG. 1 shows a drive train according to the invention in the form of a structural diagram of the entire system.

A drive train 1 of a motor vehicle (FIG. 1) includes an engine controller ("EMS") 2 and a transmission controller ("TCU") 3 including a clutch controller, which is connected to the engine controller 2 by means of data lines 4 which are expediently embodied as a databus. The engine controller 2 includes an engine speed regulator 6 with an anti-jerk function (also referred to as "jerk control") whose controlled output is connected by means of a signal line 7 to what is referred to as a decision cascade or decision logic 8. Logic 8 includes a torque model of the drive train and which receives the driver's wishes via a signal line 9 which is connected to the accelerator pedal (not illustrated here) of the motor vehicle.

The engine speed regulator 6 receives the respective current engine speed Nmot via a signal line 10 from an engine speed sensor (not illustrated). The decision cascade 8 receives a first setpoint engine torque Mmot, setp,1 from the transmission and clutch controller 3 via the databus 4, and a second setpoint engine torque 4 Mmot,setp,2 or else an engine setpoint torque difference ΔMmot,setp=Mmot,setp, 1−Mmot,setp,2 from the engine speed regulator via the signal line 7.

The decision cascade 8 is connected via signal lines 12 to the following output stages: an output stage 13 for an electronic shuttle valve or engine power controller ("ETC"), an output stage 14 for the injection of fuel into the engine, an output stage 15 for the ignition and an output stage 16 for a crankshaft starter generator ("KSG", also referred to as "ISG") 21. The output stage 13 is connected to an electronics throttle valve (in the intake air path of the engine) 18, the output stage 14 is connected to an injection system 19, the output stage 15 is connected to an ignition system 20 and the output stage 16 is connected to the crankshaft starter generator 21. The respective connection is made via control lines shown in the drawing. The engine assemblies 18 to 20 illustrated here are intended to represent an engine known per se.

The transmission and clutch controller 3 contains a shift controller (also referred to as AMT manager) 22 which is connected to actuator valves 24 for the transmission via a multiple control line 23. Transmission actuators 26 which bring about the disengagement and engagement of gear speeds and the activation of brakes and clutches, as is known in automated manually-operated transmissions and fully automatic transmissions with a torque converter, are activated by means of these actuator valves. A single transmission actuator 26 is illustrated here by way of representation for a transmission which is known per se, in particular an automated (manually-operated) transmission.

The transmission and clutch controller 3 also includes a clutch controller 28 which is connected via a control line 29 to an actuator valve 30 for a clutch actuator in an automatic clutch 31.

The engine actual variables, i.e. in particular the actual engine speed and the actual engine torque, are transferred to the shift controller 22 from the engine controller 2 via the data bus 4. The shift controller 22 transmits the setpoint engine speed Nmot,setp to the engine speed regulator 6, the setpoint torque Mmot,setp to the decision cascade 8, and transmits to both a signal which specifies the method of intervention and which is designated below as intervention signal ES and which will be explained with reference to FIGS. 2 to 5.

The intervention signal ES brings about interaction between the AMT manager 22 and the engine controller 2, thus ensuring comfortable operation of the drive train 1 and substantially jerk-free driving of the motor vehicle. In a basic operating state or a basic phase "0" (FIG. 2), the motor vehicle drives with the gear engaged without shifting gear and the engine is controlled by the engine controller 2 which transmits its actual variables to the shift controller 22.

In a first operating state or phase "I", a gear shift operation has been initiated and the engine torque is selectively controlled—brought about by the intervention signal of the transmission controller 3. It is reduced here in a known fashion in order to shift the transmission in a load-free fashion and to prevent a gear shift jolt or jerk in the drive train when declutching takes place. At the same time, the automatic clutch 31 is opened. That is, it is moved from its engaged position EK in the direction of its declutched or disengaged position AK.

Figure 3:
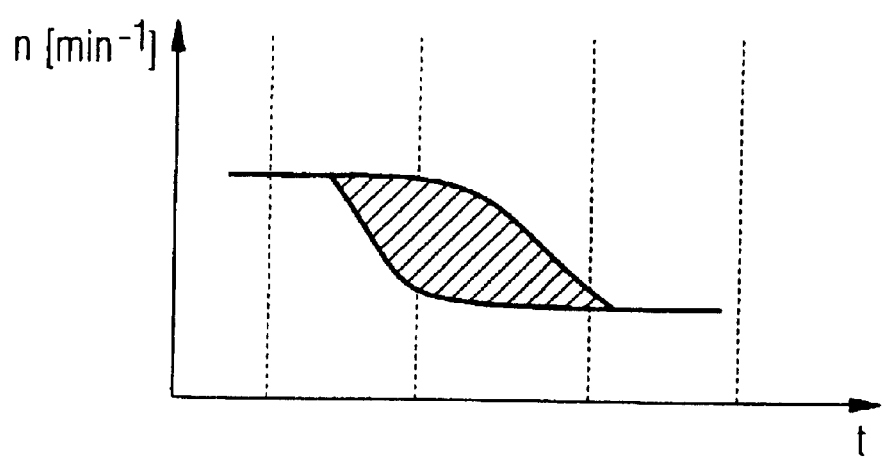
FIG. 3 shows the variation of the engine speed over time during a gear shift operation in the drive train according to FIG. 1.

From the moment at which the clutch begins to open, starting from a separating point SP, it is possible to transmit less (engine) torque so that the requested torque Tq_req drops rapidly. This occurs until the clutch is entirely opened in an operating state "II" such that no torque is transmitted in the drive train. In this phase, the engine state is determined by adjusting the engine speed to predefined values. FIG. 3 shows the associated engine speed profile, the adjustment range being represented by hatching.

In the following clutch engagement phase, energy compensation between the engine as torque generator and the inertia of the vehicle is carried out in an operating state "III" by means of the drive train 1, including the vehicle tires. The drive train 1 comprises a system which is capable of oscillation, and which can be made to oscillate strongly in the case of uncontrolled energy compensation, as a result of suspension and damping elements contained in it. These oscillations can be sensed by sensors in the form of changes in engine speed and by the driver in the form of unpleasant jerking.

When the clutch is opened and closed, the drive train experiences a structural change in the form of modified inertia. Starting from a certain clutch travel, the clutch is to be considered as "closed" in the sense that its damping effect resulting from the friction component disappears. As a result, oscillations can be transmitted directly from the drive train to the engine and can thus be influenced actively by the engine. The drive torque is controlled here again in order to adapt it to the torque which is to be expected in the new gear speed.

This structural change is sensed by the clutch controller 28 (FIG. 1) and a "structural switchover" is subsequently carried out. This is reported to the engine controller 2 by the transmission controller 3, in particular by its shift controller 22 using the intervention signal ES which specifies the method of intervention. The intervention signal ES brings about switching over between the two values of the setpoint engine torque Mmot,setp,1 and Mmot,setp,2 in the decision cascade 8. The engine controller 2 carries out an adjustment of the engine speed by reference to the setpoint values obtained from the shift controller.

For this purpose, a jerk control (also referred to as anti-jerking function) which is present in the engine controller 2 is used. The jerk control is provided for manually-operated transmissions and is triggered by means of a switch on the clutch pedal. As soon as a clutch engagement operation is detected, this jerk control attempts to compensate rapid changes in the engine speed by means of an adjustment of the engine speed. The engine torque is used here as the manipulated variable.

In terms of the operation, the engine speed is itself influenced by the dynamic torque in the drive train which originates from a tortional vibration configuration in the transmission and in the power output.

Figure 4:
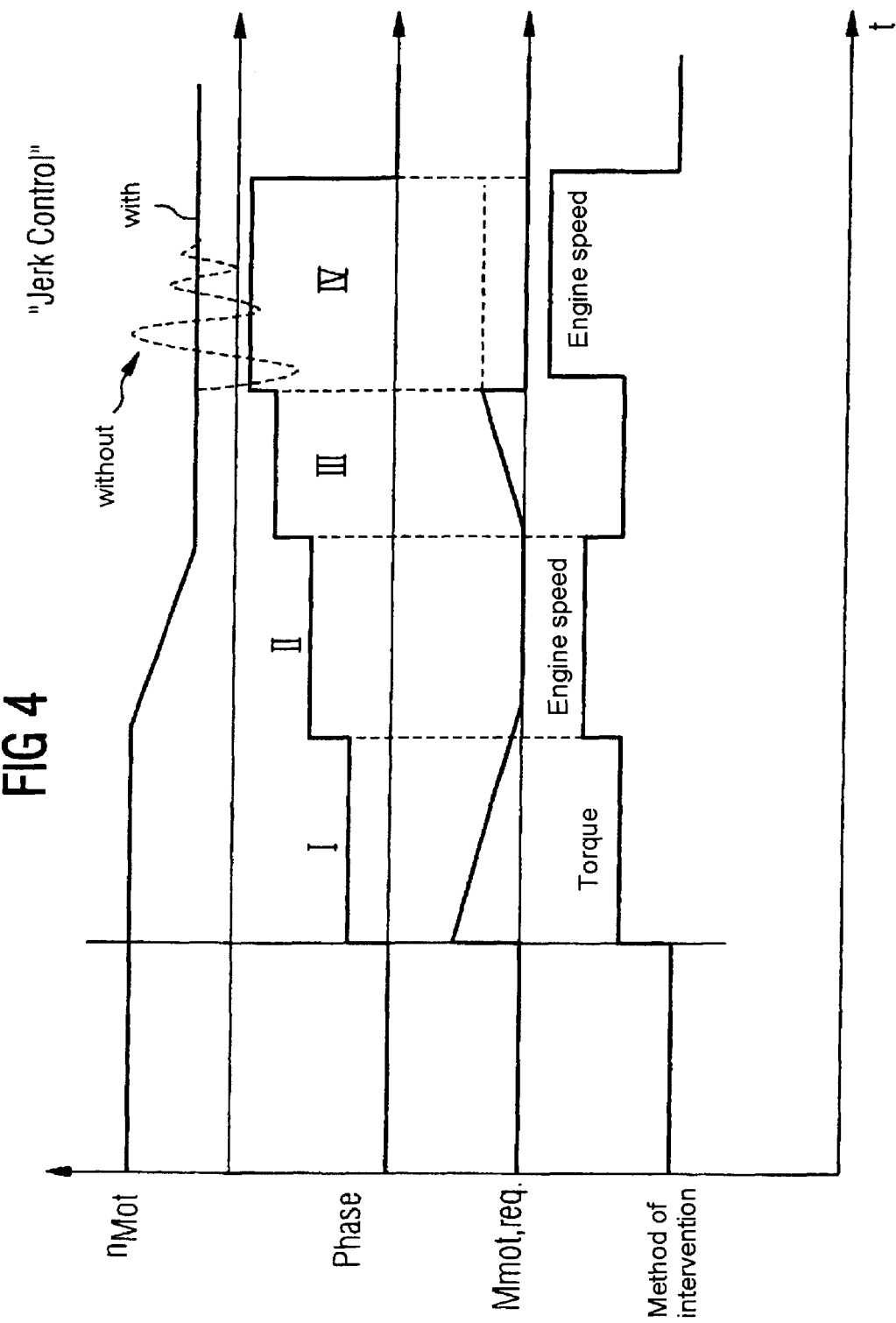
FIG. 4 shows the profile over time of a shift up operation with reference to various engine operating variables and signals.

FIG. 4 shows changes in engine operating variables and signals over time in the drive train 1 when a shift up operation is carried out. The illustrations show the various phases of the gear shift operation in the sequence from top to bottom:
- the engine speed with jerk control. The engine speed profile without such control is indicated by a broken line.
- Numbering of the various phases of the gear shift operation.
- The requested engine torque $M_{mot,req}$.
- The method of intervention.

The interface which is implemented in this way between the engine and the transmission controller is a flexible design in order to be able to implement different intervention possibilities. For example, interventions both in the engine speed and in the torque. The decision cascade 8 in the engine controller 2 activates at the engine end an engine speed adjustment (in phase II) and a torque control (in phases I and III) depending on the method of intervention. When a torque sensor is available, the engine torque can also be adjusted.

During phase "0", in which normal driving mode applies without a gear shift operation, there is, as mentioned above, no intervention into the engine on the part of the transmission controller, and the intervention signal ES has a first value (operating state 0). In a phase I, which corresponds to the operating state "I" in FIG. 2, a gear shift operation is initiated and the engine torque is reduced. In a phase II (corresponding to operating state II), the clutch is entirely opened and no torque is transmitted in the drive train. A slow adjustment of the engine speed takes place. In a phase III (operating state III), the engine torque is controlled again. In order to adapt it to the driver's desired torque in the new gear speed, it is increased during the shift up operation.

In a phase IV, the abovementioned structural conversion of the drive train has taken place and oscillations can occur in it. A jerk control is carried out, specifically in the form of a rapid adjustment of the engine speed. The gear shift operation is then concluded and the engine intervention terminated.

Instead of an internal combustion engine, an electric machine, for example a crankshaft starter generator (KSG), can be controlled in the way described above. Electric machines are advantageous insofar as they have a significantly higher dynamic and resolution than internal combustion engines. These properties are ideal for active attenuation of tortional vibrations in phase IV. In a drive train with a KSG 21 it is possible to feed into the drive a torque $M_{ind}$ which is complementary to the tortional vibration component $\sin(\omega t) \times M$:

$$M_{ges} = M_{ind} + \sin(\omega t + \phi) \times M$$

Here, $M_{ges}$ is the overall engine torque, $M_{ind}$ is the fed-in torque, M is the amplitude of the setpoint engine torque supplied by the decision cascade, $\omega$ is the angular speed and $\phi$ is a constant which takes into account the phase shift.

If the ignition angle is changed in the drive train or the injector quantity is changed in a diesel engine in order to prevent jerking, the ignition angle is adjusted in the "retarded" direction in the case of a positive amplitude. That is, an engine actual speed which is above the engine setpoint speed, as a result of the superimposed tortional vibration. In the case of a diesel engine the injection quantity is reduced.

In phase II, an adjustment of the engine speed is performed to a predefined absolute value over a frequency range which is as big as possible, i.e. by means of intervention in the intake air path and the ignition in the case of a petrol engine. In phase IV, highly dynamic adjustment is carried out by means of the ignition angle or by means of the crankshaft starter generator 21.

The method which is described above can be used not only in automated transmissions but also in any type of transmission because the problems of the excitation of the drive train as a result of closing clutches is generally significant. For example, both when engaging the clutch during a starting up operation (with dry or wet clutches) and when activating all-wheel locks in offroad motor vehicles).

Figure 2:
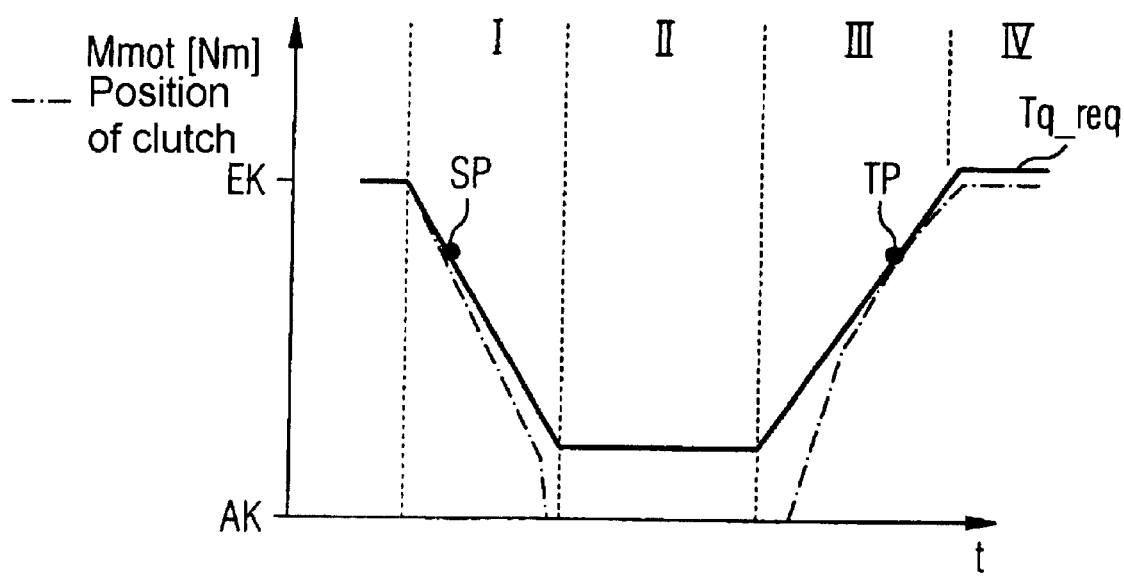
FIG. 2 shows the variation of the engine torque and of the clutch position over time during a gear shift operation in the drive train according to FIG. 1.
Figure 5:
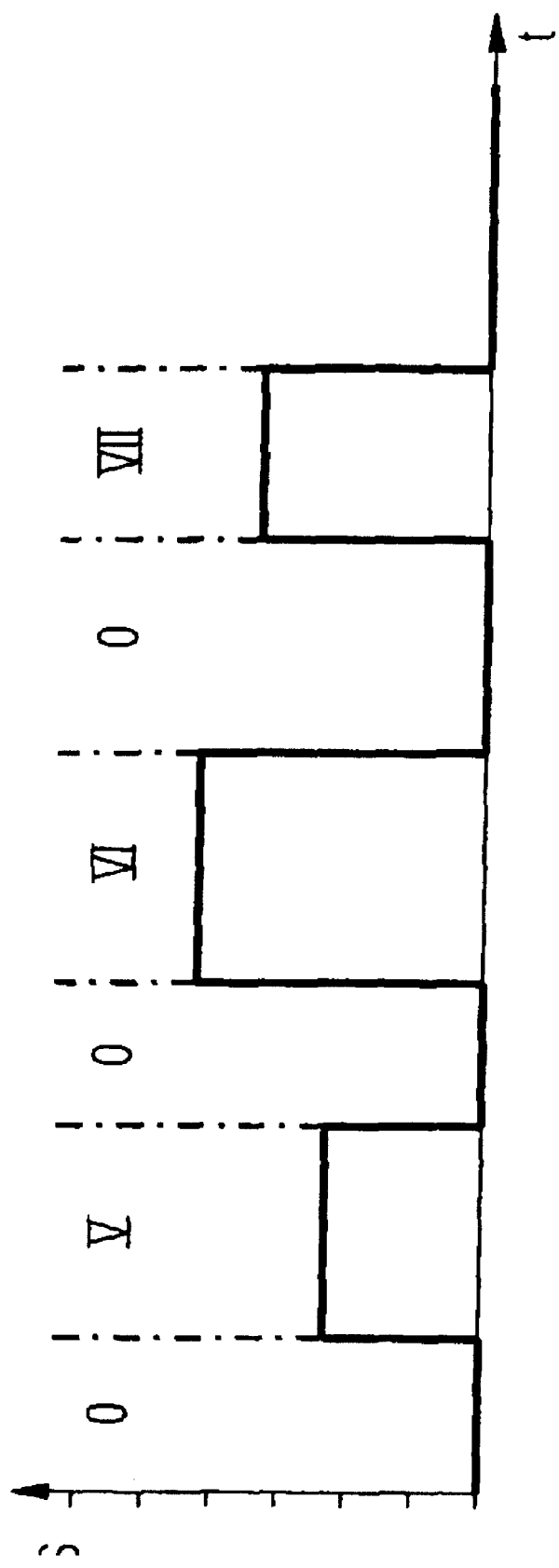
FIG. 5 shows values of an intervention signal during various phases of the operation of the drive train according to FIG. 1.

FIG. 5 shows values of the intervention signal ES for various phases of operating states of the drive train 1. In addition to the value in the basic operating state "0", it has, in a phase V, a fifth value at which a shift up operation is carried out, in a phase VI a sixth value in which the motor vehicle is accelerated and in a phase VII a seventh value at which a shift down operation is carried out. The value V is illustrated in simplified form for the sake of clarity. The values II to IV shown in FIG. 2 are also illustrated. The same applies for the value VII.

Figure 6:
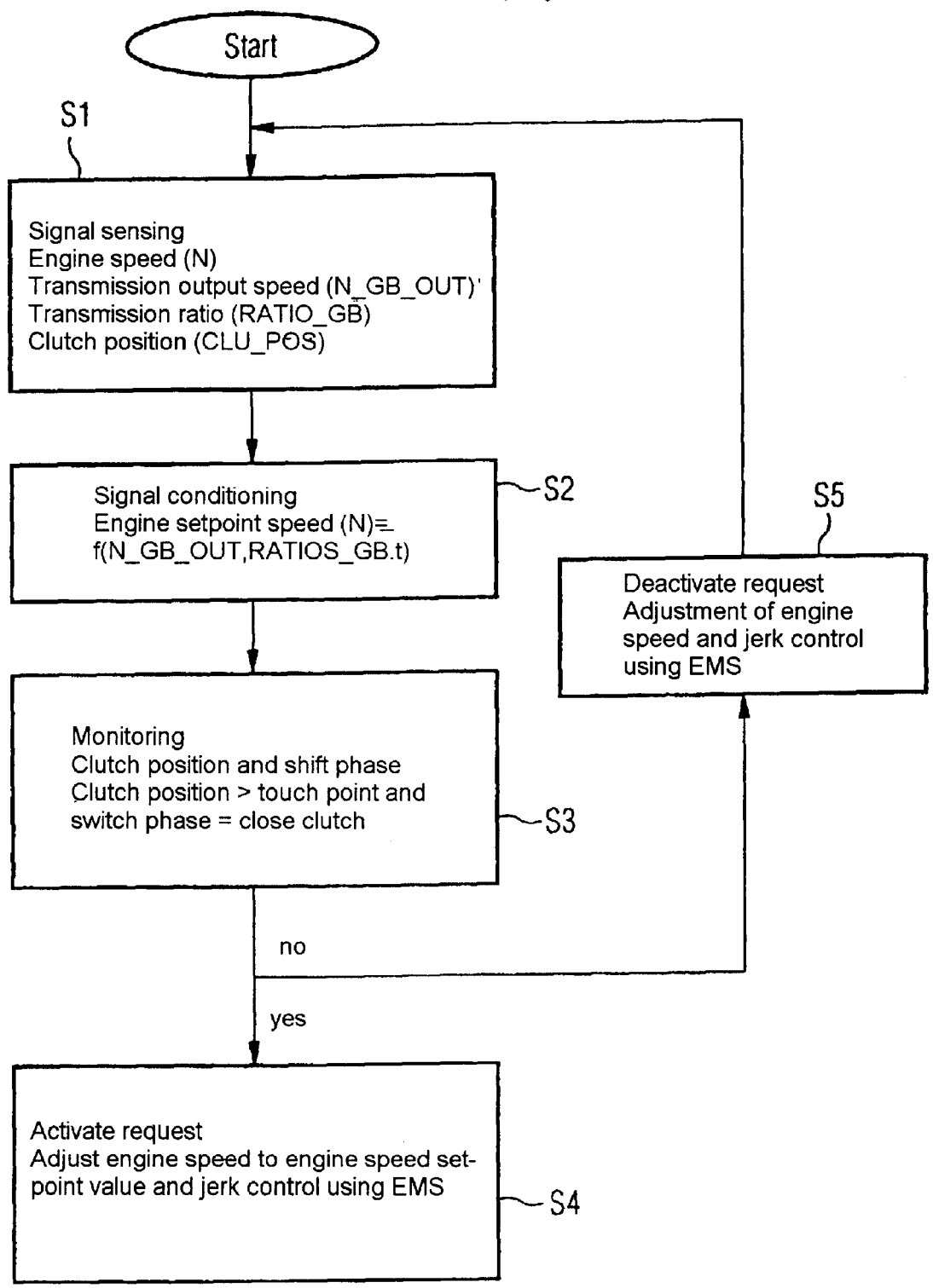
FIG. 6 shows the flowchart of a program which is processed by the controller of the drive train according to FIG. 1.

The flowchart which is shown in FIG. 6 represents a computer program which is processed when the drive train 1 is controlled. The processing takes place in the shift controller 22. The computer program includes:
Start
S1—Signal sensing. The signals: engine speed, transmission output speed, transmission ratio and clutch position are sensed. The transmission ratio can be calculated from the engine speed and the transmission output speed.
S2—Signal conditioning. The engine setpoint speed is calculated by means of the sensed signals.
S3—The clutch position and the switch phase are monitored. It is checked whether the position of the clutch has exceeded its contact point ("touch point") and whether the shift phase "closed clutch" has been reached. If the result is positive,
S4—a request is activated. That is, an intervention signal is generated which causes the engine speed to be adjusted to a setpoint value predefined by the transmission controller 3 and brings about jerk control by means of the engine controller 2. If the result of S3 is, on the other hand, negative, S5—the request is deactivated. The engine speed adjustment and the jerk control are carried out solely by the engine controller.

This program is processed in an uninterrupted cyclical fashion during the operation of the drive train 1. That is, the uninterrupted cyclical fashion continues as long as the motor vehicle is operating.

What is claimed is:

1. A drive train for a motor vehicle, comprising:

an engine which is controlled by an engine controller;

a transmission which is controlled by a transmission controller; and a data link between the engine controller and the transmission controller, wherein signals are exchanged during a gear shift operation of the transmission, sensor signals being transferred from the engine controller to the transmission controller and an intervention signal being transferred from the transmission controller to the engine controller, by means of which intervention signal the engine is controlled by the engine controller during the driving mode of the motor vehicle, the intervention signal has a plurality of values by which the engine torque is reduced with the engine controller during the gear shift operations of the transmission, the engine speed is adjusted to a predefined value, the engine torque is switched over to a new setpoint value and a jerk control is carried out by adjusting the engine speed, wherein the intervention signal has an initial value in which a normal driving mode applies without a gear shift operation, a first value in which a torque control is carried out, a second value in which a slow engine speed adjustment is carried out, a third value in which a torque control is carried out and a fourth value in which a rapid engine speed adjustment is carried out with the drive train closed.

2. The drive train as claimed in claim 1, wherein the intervention signal has an initial value in which a normal driving mode applies without a gear shift operation, a first value in which a torque control is carried out, a second value in which a slow engine speed adjustment is carried out, a third value in which a torque control is carried out and a fourth value in which a rapid engine speed adjustment is carried out with the drive train closed.

3. The drive train as claimed in claim 1, wherein a mixed engine torque and engine speed control is brought about by the second value of the intervention signal.

4. The drive train as claimed in claim 1, wherein a torque adjustment is carried out by the first and third values of the intervention signal.

5. The drive train as claimed in claim 1, wherein the intervention signal has an initial value in which normal driving mode applies without a gear shift operation, a fifth value in which a shift up operation is carried out, a sixth value in which the motor vehicle is accelerated, and a seventh value in which a shift down operation is carried out.

6. The drive train as claimed in claim 5, wherein a combined engine torque and engine speed control is carried out at the fifth value of the intervention signal.

7. The drive train as claimed in claim 5, wherein the engine speed is accelerated at the sixth value of the intervention signal.

8. The drive train as claimed in claim 5, wherein an engine speed adjustment is carried out at the seventh value of the intervention signal.

9. The drive train as claimed in claim 1, wherein the drive train includes an engine which is embodied as a crankshaft starter generator.

10. The drive train as claimed in claim 9, wherein a rapid engine speed adjustment is performed to a predefined absolute value using the crankshaft starter generator.

* * * * *